9614X
H. BARCLAY.
THRESHING MACHINE.
Patented Apr. 28, 1836.
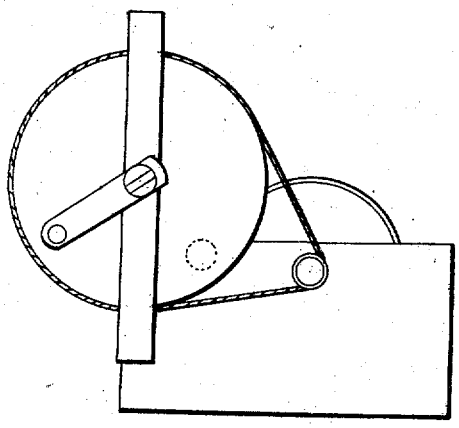
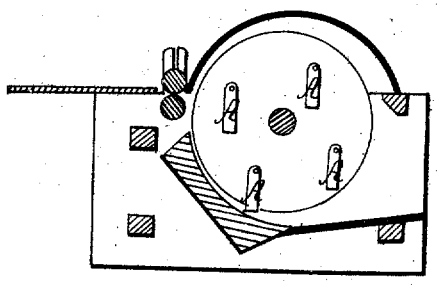
B C
A
THE NORRIS PETERS CO., PHOTO-LITHO., WASHINGTON, D. C.

Apl. 28. 1836 ar. 13 181

9614X Hugh Barclay
Letters Patent

The schedule referred to in these Letters Patent and making part of
the same containing a description in the words of the said Hugh
Barclay himself of his improvement in the Thrashing Machine.

---

To all to whom these presents shall come. Be it known that I Hugh Bar-
clay of the town of Lexington in the County of Rockbridge and State of
Virginia have invented a new and usefull improvement in the Thresh-
ing Machine now known and distinguished from all other Threshing Ma-
chines as "Barclay's rotary supple or Flail Threshing Machine" adapted
to all the purposes of threshing as well grain of all kinds as also Rice, Pulse,
clover and other grasses. The improvement consists in operating with a
metallic supple or flail revolving upon a rod of wrought iron, steel, copper
or other metal of sufficient strength to effect the purposes intended. The man-
ner of constructing the flail or supple may be varied according to the fan-
cy of the person intending to build or use the machine, that is whether the
the hole through the flail shall be drilled or punched or whether it
shall be simply drawn and lapped or welded. the mode recommended
is to have wrought iron drawn into bars of suitable size to make the flails
say one inch wide and three eighths of an inch thick let the flail be cut
of any length that may please having carefull to have them all of the same
length. this may be from three to six inches long as may be required by the
velocity of the machine. The supple or flail A is made by inserting
a hole near to one end of sufficient size to receive the rod B on which
the flail has a rotary action when the machine is in motion. The washer
C may be made of cast or wrought iron, leather or other substance of suitable
strength and thickness. the washer is placed alternately between the flails
or supples so that their action shall not interfere with each other. a
washer of three eighths of an inch in thickness seems best calculated for
the threshing of wheat, Rye and Oats. The horizontal rod B on which
the flails and washers are fixed should be round and of sufficient strength to resist the action of the machine. It may be fastened by screws or rivetted
or keyed to heads or arms or fastened to a cylinder by any mode that fan-
cy or convenience may dictate care being had that the fastenings be of suf-
ficient strength and number to prevent them from drawing out or the rod
breaking off by the action of the machine The length of the horizontal rods and
their number as well as the number of flails and their length may be
regulated by a knowledge of the strength of the propelling power, always
observing that a slow motion requires a longer flail or supple than a motion
of greater velocity. The advantages of this improvement are that it thresh-
es as clean as any other machine, requires less motive power to operate
with effect than any other and is not injured by hard substances passing
through the machine when in operation by the fact that the supple or
flail is instantly thrown back within the range whenever it encounters
any substance that does not yield to its force and immediately resumes
its position for work by the centrifugal force of the revolving cylinder
heads or arms to which the flails may be fixed. What I claim as my
own invention and not previously known as described in the foregoing
is the Rotary Supple or flail revolving upon a rod as before described.

Witnesses
James W. Davidson
Saml. R. Jordan

Hugh Barclay

Drawing 637 h 07